United States Patent [19]

Yamada et al.

[11] Patent Number: 5,407,882

[45] Date of Patent: Apr. 18, 1995

[54] OLEFIN POLYMERIZATION CATALYST AND OLEFIN POLYMERIZATION PROCESS

[75] Inventors: Satoru Yamada, Mie; Akihiro Yano, Yokkaichi, both of Japan

[73] Assignee: Tosoh Corporation, Shinnanyo, Japan

[21] Appl. No.: 100,174

[22] Filed: Aug. 2, 1993

[30] Foreign Application Priority Data

Aug. 4, 1992 [JP] Japan ................................. 4-226497
Aug. 12, 1992 [JP] Japan ................................. 4-235116
Dec. 7, 1992 [JP] Japan ................................. 4-326673

[51] Int. Cl.$^6$ ............................................. B01J 31/14
[52] U.S. Cl. ..................................... 502/114; 502/115; 502/117
[58] Field of Search ........................ 502/114, 115, 117

[56] References Cited

U.S. PATENT DOCUMENTS 5,241,025 8/1993 Hentky et al. ...................... 502/117
5,278,119 1/1994 Turner et al. ....................... 502/117

FOREIGN PATENT DOCUMENTS 0277004 8/1988 European Pat. Off. .
0314797 5/1989 European Pat. Off. .
0481480 4/1992 European Pat. Off. .
0513380 11/1992 European Pat. Off. .

OTHER PUBLICATIONS

Journal of American Chemical society, vol. 109, No. 13, pp. 4111–4113, R. F., Jordan, et al., "Chemistry of Cationic Zirconium (IV) Benzyl complexes, One Electron Oxidation of dO Organometallics", Feb. 9, 1987.

Journal of American Chemical Society, vol. 110, No. 18, pp. 6255–6256, May 13, 1988, J. A. Ewen, et al., "Syndiospecific Propylene Polymerizations with Group 4 Metallocenes".

Primary Examiner—Asok Pal

Attorney, Agent, or Firm—Oblon, Spivak, McClelland, Maier & Neustadt

[57] ABSTRACT

A catalyst for polymerization of olefin is provided which comprises (A) a metallocene compound, (B) an organoaluminum compound, and (C) a metal borate or a metal aluminate. The metallocene compound (A) is represented by the general formula (1) below:

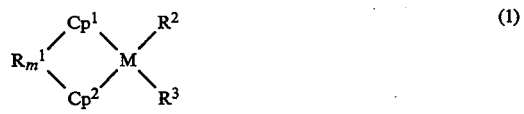

(1)

where $Cp^1$ and $Cp^2$ are cyclopentadienyl group; $R^1$ is an alkylene, arylalkylene, dialkylsilylene, dialkylgermanylene, alkylphosphinediyl, or alkylimino group, $R^1$ crosslinking $Cp^1$ and $Cp^2$ together; m is 0 or 1; M is titanium, zirconium, or hafnium; and $R^2$ and $R^3$ are independently hydrogen, halogen, or a hydrocarbon group, an alkoxy group, or an aryloxy group having 1 to 12 carbons, the organic aluminum compound (B) is represented by the general formula (2) below:

$$AlR^4{}_3 \qquad (2)$$

where each $R^4$ is independently hydrogen, alkyl, alkoxy, or an aryl group, at least one $R^4$ being an alkyl group, and the metal borate or the metal aluminate (C) being represented by the general formula (3):

$$(C(L)_n)_b (A)_d \qquad (3)$$

where C is an alkali metal cation or an alkaline earth metal cation; L is a Lewis base; A is an art ion having elemental boron or elemental aluminum; n is an integer of from 0 to 6; b and d are respectively an integer selected to balance the electric charge.

13 Claims, No Drawings

OLEFIN POLYMERIZATION CATALYST AND OLEFIN POLYMERIZATION PROCESS

BACKGROUND OF THE INVENTION

1. Field of the Invention

The present invention relates to an olefin polymerization catalyst comprising a metallocene compound, an organoaluminum compound, and a metal borate or aluminate, and a process for polymerizing olefin by use of the catalyst.

2. Description of the Related Art

Various catalysts are known for olefin polymerization. Japanese Patent Application Laid-Open No. 3-197513 discloses polymerization of ethylene by use of a metallocene compound and an organoaluminum compound as the catalyst. Japanese Patent Application Laid-Open No. 3-290408 discloses a process for producing polyethylene or ethylene copolymer by use of a zirconocene compound, an organoaluminum compound, and an organomagnesium compound as the catalyst. These catalysts, however, are not satisfactory in activity in polymerization of propylene although they are useful for production of polyethylene and ethylene copolymers.

Further, Japanese Patent Application Laid-Open No. 58-19309 and other papers disclose processes of polymerization of olefin including propylene with a catalyst constituted of a metallocene compound and methylaluminoxane with high activity. This catalyst system has disadvantages of high cost of the methylaluminoxane and residual aluminum in the formed polymer a relatively large amount of the methylaluminoxane needs to be used.

Japanese Patent Application Laid-Open No. 3-207704 discloses a highly active catalyst for polymerization of olefin including propylene: the catalyst composed of an ionic metallocene is activated by addition of an organoaluminum compound. The ionic metallocene, the main catalyst, is generally prepared by reaction of a metallocene compound with an ionizing ionic compound. The ionizing ionic compound for preparing the ionic metallocene catalyst is synthesized by converting a metal borate or a metal aluminate into an ammonium salt or a triphenylcarbenium salt. Therefore, this catalyst system has disadvantages that synthesis of the ionizing ionic compound requires many steps of operations and involves many problems on the purity thereof, reproducibility in the synthesis, deactivation during storage and on transfer to a polymerization vessel, and so forth.

The inventors of the present invention made comprehensive investigation to solve the above problems, and found that olefin is polymerized with a catalyst formed from a metallocene compound, an organoaluminum compound, and a metal borate or aluminate, which is to be converted to the ionizing ionic compound, with high catalyst activity to produce polyolefin of high moldability.

SUMMARY OF THE INVENTION

The present invention intends to provide a catalyst for polymerization of olefin formed from the components of a metallocene compound, an organoaluminum compound, and a metal borate or aluminate.

The present invention also intends to provide a process of polymerization of olefin with the above catalyst.

The catalyst for polymerization of olefin of the present invention comprises (A) a metallocene compound, (B) an organoaluminum compound, and (C) a metal borate or a metal aluminate:

the metallocene compound (A) being represented by the general formula (1) below:

where $Cp^1$ and $Cp^2$ are independently a substituted or unsubstituted cyclopentadienyl group; $R^1$ is an alkylene group, an arylalkylene group, dialkylsilylene group, dialkylgermanylene group, an alkylphosphinediyl group, or an alkylimino group having 1 to 20 carbons, $R^1$ crosslinking $Cp^1$ and $Cp^2$ together; m is 0 or 1; M is titanium zirconium, or hafnium; and $R^2$ and $R^3$ are independently hydrogen, halogen, or a hydrocarbon group, an alkoxy group, or an aryloxy group having 1 to 12 carbons, the organoaluminum compound (B) being represented by the general formula (2) below:

where each $R^4$ is independently hydrogen, an alkyl group, an alkoxy group, or an aryl group, at least one $R^4$ being an alkyl group, and the metal borate or the metal aluminate (C) being represented by the general formula (3):

where C is an alkali metal cation or an alkaline earth metal cation; L is a Lewis base; A is an anion having elemental boron or elemental aluminum; n is an integer of from 0 to 6; b and d are respectively an integer selected to balance the electric charge.

The process of polymerization of olefin of the present invention is conducted by use of the above catalyst.

DETAILED DESCRIPTION OF THE PREFERRED EMBODIMENT

The metallocene compound employed in the present invention is represented by the general formula (1) above. The specific examples of the metallocene includes:
bis(cyclopentadienyl)zirconiumdimethyl,
bis(methylcyclopentadienyl)zirconiumdimethyl,
bis(butylcyclopentadienyl)zirconiumdimethyl,
ethylenebis(indenyl)zirconiumdimethyl,
isopropylidene(cyclopentadienyl-1-fluorenyl)zirconiumdimethyl,
dimethylsilylbis(2,4,5-trimethylcyclopentadienyl)zirconiumdimethyl,
dimethylsilylbis(2,4-dimethylcyclopentadienyl)zirconiumdimethyl,
dimethylsilylbis(3-methylcyclopentadienyl)zirconiumdimethyl,
bis(cyclopentadienyl)zirconium dichloride,
bis(methylcyclopentadienyl)zirconium dichloride,
bis(butylcyclopentadienyl)zirconium dichloride,
ethylenebis(indenyl)zirconium dichloride,
isopropylidene(cyclopentadienyl-1-fluorenyl)zirconium dichloride,
dimethylsilylbis(2,4,5-trimethylcyclopentadienyl)zirconium dichloride, dimethylsilylbis(2,4-dimethylcyclopentadienyl)zirconium dichloride,
dimethylsilylbis(3-methylcyclopentadienyl)zirconium dichloride,
bis(cyclopentadienyl)zirconiumdiphenyl,
bis(methylcyclopentadienyl)zirconiumdiphenyl,
bis(butylcyclopentadienyl)zirconiumdiphenyl,
ethylenebis(indenyl)zirconiumdiphenyl,
isopropylidene(cyclopentadienyl-1-fluorenyl)zirconiumdiphenyl,
dimethylsilylbis(2,4,5-trimethylcyclopentadienyl)zirconiumdiphenyl,
dimethylsilylbis(2,4-dimethylcyclopentadienyl)zirconiumdiphenyl,
dimethylsilylbis(3-methylcyclopentadienyl)zirconiumdiphenyl,
bis(cyclopentadienyl)zirconiumdibenzyl,
bis(methylcyclopentadienyl)zirconiumdibenzyl,
bis(butylcyclopentadienyl)zirconiumdibenzyl,
ethylenebis(indenyl)zirconiumdibenzyl,
isopropylidene(cyclopentadienyl-1-fluorenyl)zirconiumdibenzyl,
dimethylsilylbis(2,4,5-trimethylcyclopentadienyl)zirconiumdibenzyl,
dimethylsilylbis(2,4 -dimethylcyclopentadienyl)zirconiumdibenzyl,
dimethylsilylbis(3-methylcyclopentadienyl)zirconiumdibenzyl,
bis(cyclopentadienyl)methoxyzirconium monochloride,
bis(methylcyclopentadienyl)methoxyzirconium monochloride,
bis(butylcyclopentadienyl)methoxyzirconium monochloride,
ethylenebis(indenyl)methoxyzirconium monochloride,
isopropylidene(cyclopentadienyl-1- fluorenyl)methoxyzirconium monochloride,
dimethylsilylbis(2,4,5-trimethylcyclopentadienyl)methoxyzirconium monochloride,
dimethylsilylbis(2,4-dimethylcyclopentadienyl)methoxyzirconium monochloride,
dimethylsilylbis(3-methylcyclopentadienyl)methoxyzirconium monochloride,
bis(cyclopentadienyl)methylzirconium monochloride,
bis(methylcyclopentadienyl)methylzirconium monochloride,
bis(butylcyclopentadienyl)methylzirconium monochloride,
ethylenebis(indenyl)methylzirconium monochloride,
isopropylidene(cyclopentadienyl-1-fluorenyl)methylzirconium monochloride,
dimethylsilylbis(2,4,5-trimethylcyclopentadienyl)methylzirconium monochloride,
dimethylsilylbis(2,4-dimethylcyclopentadienyl)methylzirconium monochloride,
dimethylsilylbis(3-methylcyclopentadienyl)methylzirconium monochloride, and the like; and metallocene compounds derived by replacing the zirconium in the above zirconium compound with titanium, or hafnium.

The organoaluminum compound (B) is represented by the general formula (2) above. The specific examples of the organoaluminum compound includes: trimethylaluminum, triethylaluminum, triisopropylaluminum, tri(n-propyl)aluminum, triisobutylaluminum, tri(n-butyl) aluminum, triamylaluminum, dimethylaluminum ethoxide, diethylaluminum ethoxide, diisopropylaluminum ethoxide, di(n-propyl)aluminum ethoxide, diisobutylaluminum ethoxide, di(n-butyl)aluminum ethoxide, dimethylaluminum hydride, diethylaluminum hydride, diisopropylaluminum hydride, di(n-propyl)aluminum hydride, diisobutylaluminum hydride, di(n-butyl)aluminum hydride, and the like.

The metal borate or the metal aluminate (C) is represented by the general formula (3) above.

The specific examples of the metal borate include:
lithium tetrakis(pentafluorophenyl) borate, lithium tetrakis(phenyl) borate, lithium tetrakis(p-tolyl) borate, lithium tetrakis(m-tolyl) borate, lithium tetrakis(2,4-dimethylphenyl) borate, lithium tetrakis (3,5-dimethylphenyl) borate, lithium tetrafluoroborate, sodium tetrakis(pentafluorophenyl) borate, sodium tetrakis(phenyl) borate, sodium tetrakis(p-tolyl) borate, sodium tetrakis(m-tolyl) borate, sodium tetrakis(2,4-dimethylphenyl) borate, sodium tetrakis (3,5-dimethylphenyl) borate, sodium tetrafluoroborate, potassium tetrakis(pentafluorophenyl) borate, potassium tetrakis(phenyl) borate, potassium tetrakis(p-tolyl) borate, potassium tetrakis(m-tolyl) borate, potassium tetrakis(2,4-dimethylphenyl) borate, potassium tetrakis(3,5-dimethylphenyl) borate, potassium tetrafluoroborate, magnesium tetrakis(pentafluorophenyl) borate, magnesium tetrakis(phenyl) borate, magnesium tetrakis (p-tolyl) borate, magnesium tetrakis(m-tolyl) borate, magnesium tetrakis(2,4-dimethylphenyl) borate, magnesium tetrakis(3,5-dimethylphenyl) borate, tetrafluoroborate, calcium tetrakis(pentafluorophenyl) borate, calcium tetrakis(phenyl) borate, calcium tetrakis(p-tolyl) borate, calcium tetrakis(m-tolyl) borate, calcium tetrakis(2,4-dimethylphenyl) borate, calcium tetrakis(3,5-dimethylphenyl) borate, calcium tetrafluoroborate, and the like; and ether complexes and tetrahydrofuran complexes of the above metal borates The specific examples of the metal aluminate include:
lithium tetrakis(pentafluorophenyl) aluminate, lithium tetrakis(phenyl) aluminate, lithium tetrakis(p-tolyl) aluminate, lithium tetrakis(m-tolyl) aluminate, lithium tetrakis(2,4-dimethylphenyl) aluminate, lithium tetrakis(3,5-dimethylphenyl) aluminate, lithium tetrafluoroaluminate, sodium tetrakis(pentafluorophenyl) aluminate, sodium tetrakis(phenyl) aluminate, sodium tetrakis(p-tolyl) aluminate, sodium tetrakis(m-tolyl) aluminate, sodium tetrakis(2,4 -dimethylphenyl) aluminate, sodium tetrakis(3,5 -dimethylphenyl) aluminate, sodium tetrafluoroaluminate, potassium tetrakis(pentafluorophenyl) aluminate, potassium tetrakis(phenyl) aluminate, potassium tetrakis(p-tolyl) aluminate, potassium tetrakis(m-tolyl) aluminate, potassium tetrakis(2,4-dimethylphenyl) aluminate, potassium tetrakis(3,5-dimethylphenyl) aluminate, potassium tetrafluoroaluminate, magnesium tetrakis(pentafluorophenyl)-aluminate, magnesium tetrakis(phenyl) aluminate, magnesium tetrakis(p-tolyl) aluminate, magnesium tetrakis(m-tolyl) aluminate, magnesium tetrakis(2,4-dimethylphenyl) aluminate, magnesium tetrakis(3,5-dimethylphenyl) aluminate, magnesium tetrafluoroaluminate, calcium tetrakis(pentafluorophenyl) aluminate, calcium tetrakis(phenyl) aluminate, calcium tetrakis(p-tolyl) aluminate, calcium tetrakis(m-tolyl) aluminate, calcium tetrakis(2,4-dimethylphenyl) aluminate, calcium tetrakis(3,5-dimethylphenyl) aluminate, calcium tetrafluoroaluminate, and the like; and ether complexes and tetrahydrofuran complexes of the above metal aluminates.

The catalyst of polymerization of olefin of the present invention can be prepared, for example, by mixing the metallocene compound (A) and the organoaluminum compound (B) with an olefin and subsequently bringing the resulting mixture into contact with the metal borate or aluminate (C). The molar ratio of the metallocene compound (A) to the metal borate or aluminate (C) is preferably in the range of from 1:0.01 to 1:1000, more preferably from 1:0.2 to 1:200, but is not specially limited thereto. The organoaluminum compound (B) is used preferably at a concentration in the range of from $1 \times 10^{-5}$ to $1 \times 10^{-3}$ mol/l.

The olefin which is polymerizable in the present invention includes alpha-olefins such as ethylene, propylene, 1-butene, 4-methyl-1-pentene, and 1-hexene; conjugated and unconjugated dienes such as butadiene, and 1,4-hexadiene; styrene; cyclic olefin such as cyclobuten; and so forth, and mixture of two or more thereof.

The polymerization of olefin in the present invention may be conducted either in a liquid phase or in a gas phase. When the polymerization is conducted in a liquid phase, any conventionally used organic solvent may be employed: the solvent including specifically benzene, toluene, xylene, pentane, hexane, methylene chloride, etc., or otherwise the olefin itself may be used as the solvent.

The catalyst of the present invention may be supported on an inert carrier. More specifically, the metallocene compound, the reaction product of the metallocene compound with the metal borate or aluminate, the reaction product of the metallocene compound with the organoaluminum compound, the metal borate or aluminate itself, or the organoaluminum compound itself may be supported on an inert carrier such as silica, alumina, magnesium chloride, a styrene-divinylbenzene copolymer, and polyethylene for use as the polymerization catalyst.

Such solid components obtained as above is particularly useful in gas phase polymerization.

The polymerization temperature is preferably in the range of from $-100°$ to $230°$ C,, but is not limited thereto.

The present invention is described in more detail by reference to examples without limiting the invention in any way.

The procedures of polymerization, reaction, and solvent purification were all conducted in an inert atmosphere. The solvent used in the reaction was purified, dried, and/or deoxidized preliminarily in a conventional method. The compounds used in the reactions were synthesized and identified in a conventional methods.

EXAMPLE 1

In a 2-liter autocalve, was placed 500 ml of toluene. Thereto 0.5 nmol of triisobutylaluminum was added, and the mixture was stirred for 10 minutes. To this solution, a solution of 0.5 umol of ethylenebis(indenyl)-zirconium dichloride, which had been synthesized by a known method, in 10 ml of toluene was added, and the mixture was stirred for 20 minutes. Thereto, 500 ml of propylene was charged, and stirred for 10 minutes. Further into the autoclave, 2.5 umol of diethyl ether complex of lithium tetrakis(pentafluorophenyl) borate together with 10 ml of toluene was injected, and polymerization was allowed to proceed at 40° C. for one hour. Consequently, isotactic polypropylene was obtained in a yield of 188 g.

Comparative Example 1

Propylene was polymerized in the same manner as in Example 1 except that 2.5 umol of dimethylanilinium tetrakis(pentafluorophenyl) borate was used in place of the diethyl ether complex of lithium tetrakis(pentafluorophenyl) borate. Consequently, isotactic polypropylene was obtained in a yield of 45 g.

EXAMPLE 2

In a 2-liter autocalve, was placed 500 ml of toluene. Thereto 0.5 mmol of triisobutylaluminum was added, and the mixture was stirred for 10 minutes. To this solution, a solution of 5 umol of isopropylidene(cyclopentadienyl-1-fluorenyl)zirconium dichloride, which had been synthesized by a known process, in 10 ml of toluene, was added, and the mixture was stirred for 20 minutes. Thereto, 500 ml of propylene was charged, and stirred for 10 minutes. Further into the autoclave, 25 umol of diethyl ether complex of lithium tetrakis(pentafluoro-phenyl) borate together with 10 ml of toluene was injected, and polymerization was allowed to proceed at 40° C. for one hour. Consequently, syndiotactic polypropylene was obtained in a yield of 110 g.

Comparative Example 2

Propylene was polymerized in the same manner as in Example 2 except that 25 umol of dimethylanilinium tetrakis(pentafluorophenyl) borate was used in place of the diethyl ether complex of lithium tetrakis(pentafluorophenyl) borate. Consequently, syndiotactic polypropylene was obtained in a yield of 30 g.

EXAMPLE 3

In a 2-liter autocalve, was placed 500 ml of toluene. Thereto 0.5 mmol of triisobutylaluminum was added, and the mixture was stirred for 10 minutes. To this solution, a solution of 0.5 umol of ethylenebis(indenyl)-zirconium-dimethyl, which had been synthesized by a known method, in 10 ml of toluene was added, and the mixture was stirred for 20 minutes. Thereto, 500 ml of propylene was charged, and stirred for 10 minutes. Further into the autoclave, 2.5 umol of diethyl ether complex of lithium tetrakis(pentafluorophenyl) borate together with 10 ml of toluene was injected, and polymerization was allowed to proceed at 40° C. for one hour. Consequently, isotactic polypropylene was obtained in a yield of 170 g.

Comparative Example 3

Propylene was polymerized in the same manner as in Example 3 except that 2.5 umol of dimethylanilinium tetrakis(pentafluorophenyl) borate was used in place of the diethyl ether complex of lithium tetrakis(pentafluorophenyl) borate. Consequently, isotactic polypropylene was obtained in a yield of 40 g.

EXAMPLE 4

In a 2-liter autocalve, was placed 500 nil of toluene. Thereto 0.5 mmol of triisobutylaluminum was added, and the mixture was stirred for 10 minutes. To this solution, a solution of 5 umol of isopropylidene(cyclopentadienyl-1-fluorenyl)zirconiumdimethyl, which had been synthesized by a known method, in 10 ml of toluene, was added, and the mixture was stirred for 20 minutes. Thereto, 500 ml of propylene was charged, and stirred for 10 minutes. Further into the autoclave, 25 umol of diethyl ether complex of lithium tetrakis(pentafluorophenyl) borate together with 10 ml of toluene was injected, and polymerization was allowed to proceed at 40° C. for one hour. Consequently, syndiotactic polypropylene was obtained in a yield of 95 g.

Comparative Example 4

Propylene was polymerized in the same manner as in Example 4 except that 25 umol of dimethylanilinium tetrakis(pentafluorophenyl) borate was used in place of the diethyl ether complex of lithium tetrakis(pentafluorophenyl) borate. Consequently, syndiotactic polypropylene was obtained in a yield of 25 g.

EXAMPLE 5

In a 2-liter autocalve, was placed 500 ml of toluene. Thereto 0.25 mmol of triisobutylaluminum was added, and the mixture was stirred for 10 minutes. To this solution, a solution of 0.25 umol of ethylenebis(indenyl)-zirconium dichloride, which had been synthesized by a known method, in 10 ml of toluene was added, and the mixture was stirred for 20 minutes. Thereto, a solution of 1.25 umol of diethyl ether complex of lithium tetrakis(pentafluorophenyl) aluminate in 10 ml of toluene was added. The autoclave was pressurized with ethylene to a pressure of 8 kg/cm$^2$, and the content in the autoclave was stirred at 40° C. for one hour to polymerize ethylene. Consequently, polyethylene was obtained in a yield of 110 g.

Comparative Example 5

Ethylene was polymerized in the same manner as in Example 5 except that 1.25 umol of dimethylanilinium tetrakis(pentafluorophenyl) aluminate was used in place of the diethyl ether complex of lithium tetrakis(pentafluorophenyl) aluminate. Consequently, polyethylene was obtained in a yield of 60 g.

As described above, with the catalyst and the olefin polymerization process of the present invention, the complicated synthesis steps are eliminated, and polyolefin having excellent properties and high moldability is produced efficiently.

What is claimed is:

1. A catalyst for polymerization, comprising (A) a metallocene compound, (B) an organoaluminum compound, and (C) a metal borate or a metal aluminate:

the metallocene compound (A) being represented by the general formula (1) below:

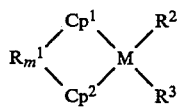    (1)

where Cp$^1$ and Cp$^2$ are independently a substituted or unsubstituted cyclopentadienyl group; R$^1$ is an alkylene group, an arylalkylene group, dialkylsilylene group, dialkylgermanylene group, an alkylphosphinediyl group, or an alkylimino group having 1 to 20 carbons, R$^1$ crosslinking Cp$^1$ and Cp$^2$ together; m is 0 or 1; M is titanium, zirconium, or hafnium; and R$^2$ and R$^3$ are independently hydrogen, halogen, or a hydrocarbon group, an alkoxy group, or an aryloxy group having 1 to 12 carbons, the organic aluminum compound (B) being represented by the general formula (2) below:

$$AlR^4{}_3 \qquad (2)$$

where each R$^4$ is independently hydrogen, an alkyl group, an alkoxy group, or an aryl group, at least one R$^4$ being an alkyl group, and the metal borate or the metal aluminate (C) being represented by the general formula (3):

$$(C(L)_n)_b(A)_d \qquad (3)$$

where C is an alkali metal cation or an alkaline earth metal cation; L is a Lewis base; A is an anion having elemental boron or elemental aluminum; n is an integer of from 1 to 6; b and d are respectively an integer selected to balance the electric charge.

2. The catalyst of claim 1, wherein n is 1.

3. The catalyst of claim 1, wherein said Lewis base is an ether compound.

4. The catalyst of claim 1, wherein said Lewis base is tetrahydrofuran.

5. The catalyst of claim 1, wherein said Lewis base is diethyl ether.

6. The catalyst of claim 2, wherein said Lewis base is diethyl ether.

7. The catalyst of claim 1, wherein R$^1$ is an alkylene group having 1 to 20 carbon atoms.

8. The catalyst of claim 1, wherein M is zirconium.

9. The catalyst of claim 1, wherein component (C) is a metal borate.

10. The catalyst of claim 6, wherein component (C) is a metal borate.

11. The catalyst of claim 1, wherein component (C) is a metal aluminate.

12. The catalyst of claim 6, wherein component (C) is a metal aluminate.

13. The catalyst of claim 1, wherein said metallocene compound is selected from the group consisting of ethylenebis(indenyl)-zirconium dichloride and isopropylidene(cyclopentadienyl-1-fluorenyl)zirconium dichloride, said organoaluminum compound is triisobutylaluminum and said component (C) is selected from the group consisting of the diethyl ether complex of lithium tetrakis(pentafluorophenyl)borate and the diethyl ether complex of lithium tetrakis(pentafluorophenyl) aluminate.

* * * * *